United States Patent

Queau et al.

[11] Patent Number: 6,091,588
[45] Date of Patent: Jul. 18, 2000

[54] MAGNETIC TAPE RECORDER HAVING A CAPACITIVE COUPLING DEVICE IN THE FORM OF FIXED AND MOBILE RINGS OR RING SEGMENTS

[75] Inventors: Alain Queau, Paris; Patrick Avenard, Palaiseau; Alain Duquenne, Clamart, all of France

[73] Assignee: Enertec, France

[21] Appl. No.: 09/008,741

[22] Filed: Jan. 19, 1998

[30] Foreign Application Priority Data

Jan. 21, 1997 [FR] France .................................. 97 00583

[51] Int. Cl.[7] ........................................................ G11B 5/52
[52] U.S. Cl. .................... 360/281; 360/281.2; 360/281.6; 360/84
[58] Field of Search ............................. 360/84, 107, 108

[56] References Cited

U.S. PATENT DOCUMENTS

| 2,602,118 | 7/1952 | Adams et al. ............................ 191/1 R |
| 4,829,401 | 5/1989 | Vranken .................................. 361/380 |
| 5,739,986 | 4/1998 | Van Vlerken et al. .................. 360/108 |

FOREIGN PATENT DOCUMENTS

| 0332520 | 9/1989 | European Pat. Off. . |
| 1191485 | 2/1958 | France . |
| 4034344 | 4/1992 | Germany . |

*Primary Examiner*—Jefferson Evans
*Attorney, Agent, or Firm*—Bierman, Muserlian and Lucas

[57] ABSTRACT

A magnetic tape recorder/reader including several magnetic heads (30–45) driven in a rotary movement at the periphery of an equatorial slot (4) of a cylindrical drum (1) on the surface of which runs a tape (7) wound helicoidally and a capacitive coupling device (20), the device being designed to transmit electrical signals between a part rotating around an axis connected to the heads and forming a rotor and a fixed part forming a stator, said device (20) including at least one coupling component (47–54, 73–80; 204; 220) comprising a mobile part (47a–54a, 73a–80a; 206; 222; 230, 232) and a fixed part (47b–54b, 73b–80b) connected respectively to the rotor and to the stator, characterized in that the mobile and fixed parts of the coupling component are made in the form of rings and/or segments of rings called coupling rings, respectively arranged in two mutually parallel planes ($P_1$, $P_2$) and perpendicular to the axis of rotation of the rotor, the mobile and fixed parts of each coupling component being arranged facing each other.

22 Claims, 7 Drawing Sheets

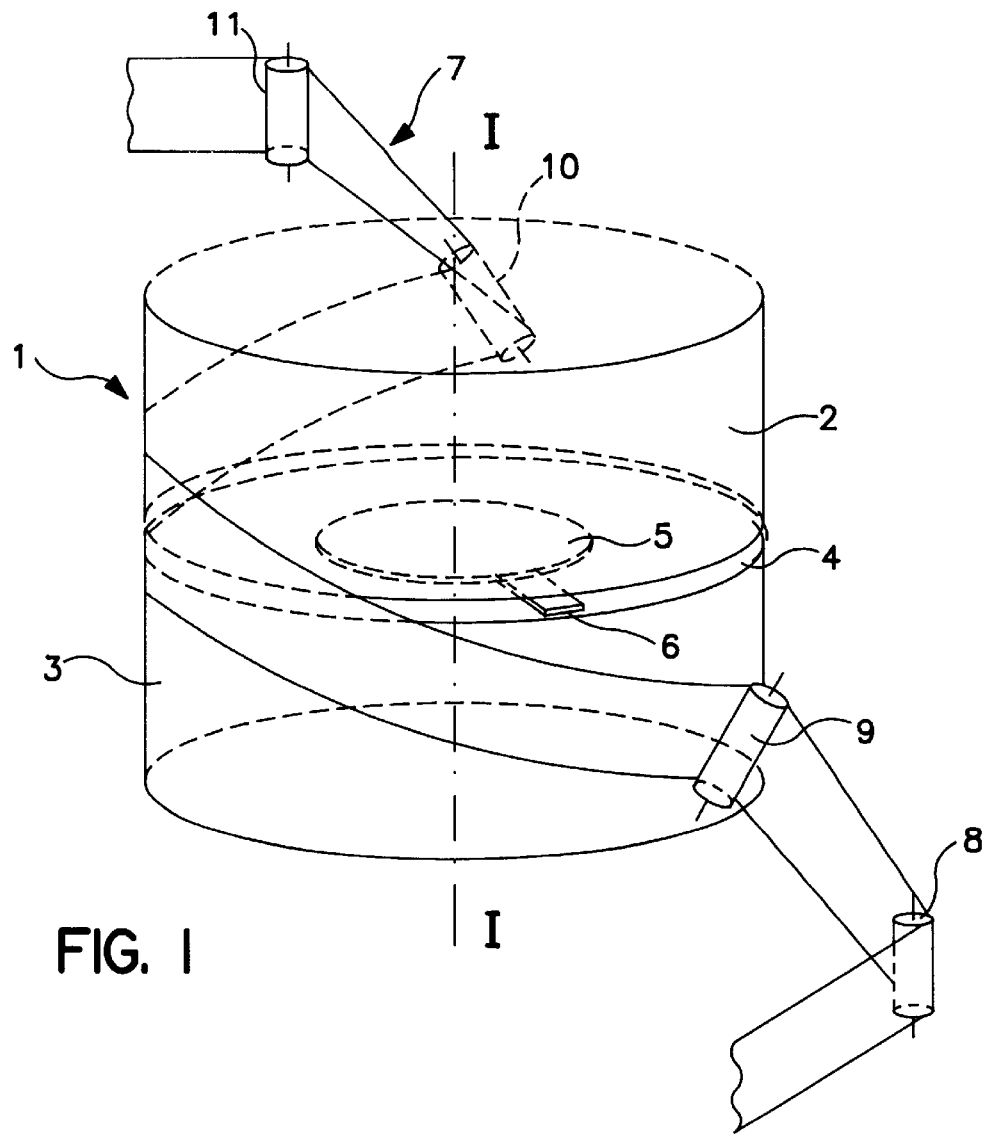
FIG. I
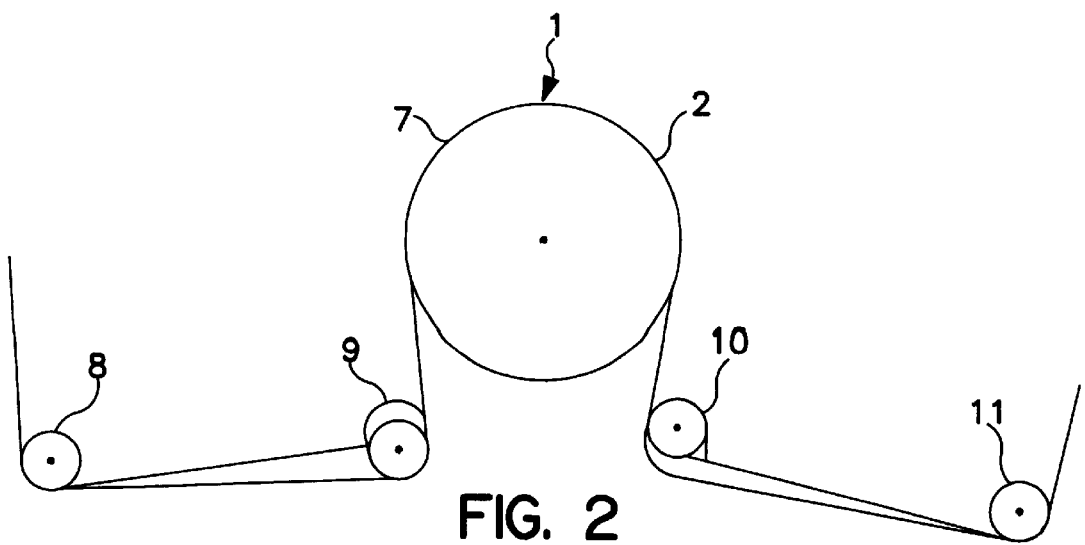
FIG. 2

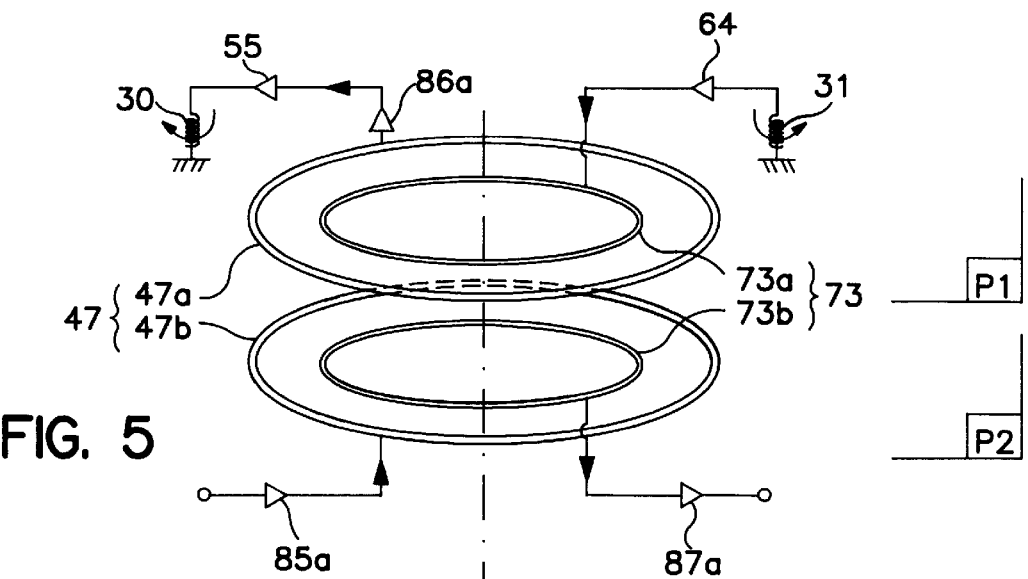
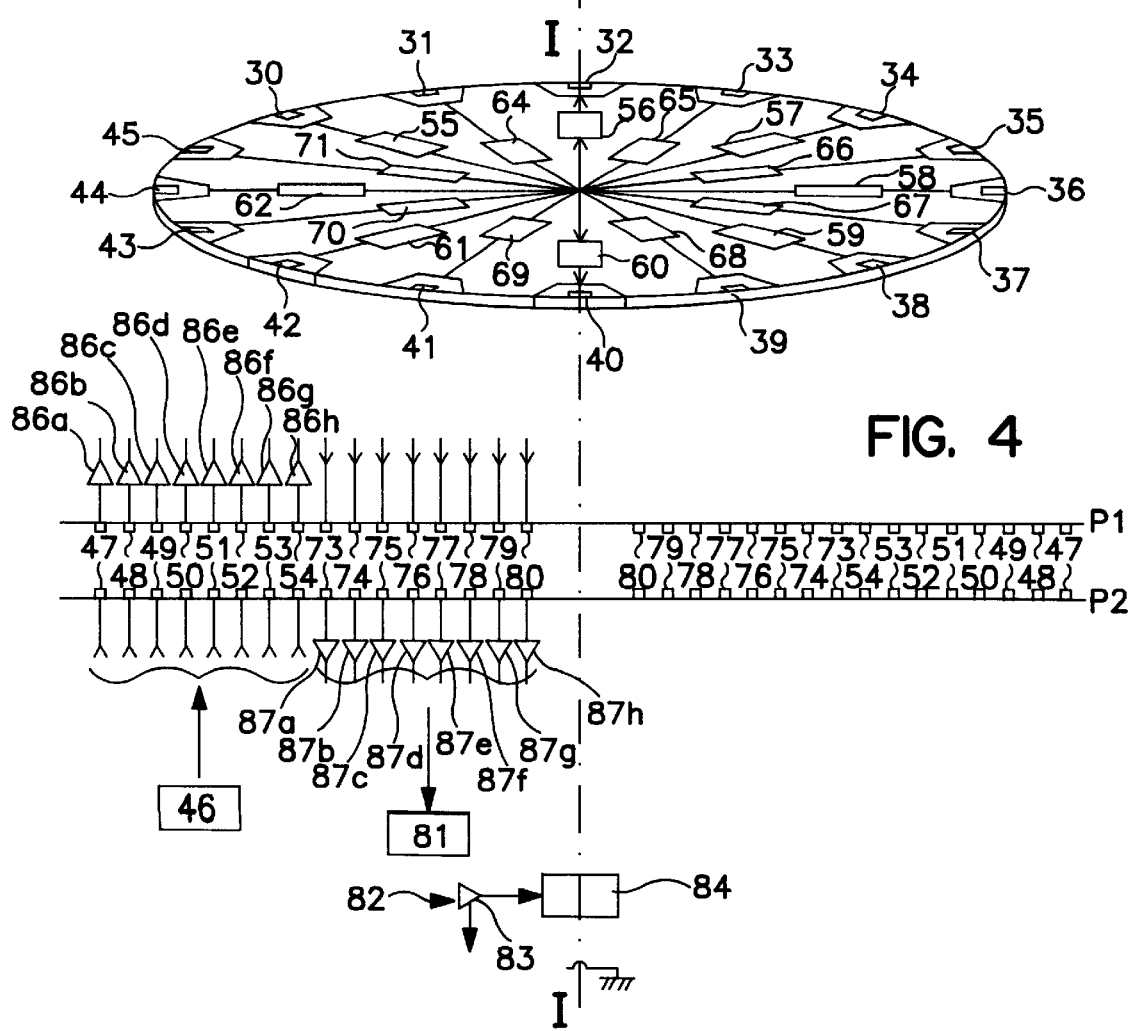

MAGNETIC TAPE RECORDER HAVING A CAPACITIVE COUPLING DEVICE IN THE FORM OF FIXED AND MOBILE RINGS OR RING SEGMENTS

The present invention concerns a revolving head recorder equipped with a capacitive rotary coupling device.

STATE OF THE ART

It is known that such recorders include one or more read-write magnetic heads attached to the periphery of a revolution element, coaxial to the axis of a cylindrical drum against the surface of which is rolled helicoidally a magnetic tape running between a feeding reel and a receiving reel. The information is recorded on the tape according to oblique tracks whose inclination is a function of the ratio of the respective speeds of the tape and of the head. The recorders of this type are of two families. In the first family, the heads are fixed on the periphery of a turning platter coaxial to the drum and arranged in a slot provided in an equatorial plane of the drum; in front of the slot runs said magnetic tape wound helicoidally on the drum. In the other family the drum includes a lower fixed part and an upper turning part at the base of which the heads are mounted.

In order to send the information between the turning heads and the (fixed) means associated with the recorder and intended to process or to emit this information (for reading or recording respectively), there is provided for each head a rotating electrical coupling device between the fixed part and the turning parts (head carrier platter) of the recorder.

Such a recorder is known from the document EP 0,332,520. According to this document for each head the rotating electrical coupling device includes a condenser which is comprised of two conducting armatures, cylindrical and concentric, arranged facing each other, one of the armatures being a solid unit with the fixed part forming the stator and the other armature being a solid unit with the rotating part connected to the head and forming the rotor.

The rotating electric coupling devices are thus stacked one above the other in the recorder.

Now, on board aircraft, the space available for technical equipment is extremely limited and the volume of the equipment loaded must therefore be as small as possible.

It would consequently be interesting to reduce the dimensions of known recorders as mentioned above.

BRIEF SUMMARY OF THE INVENTION

The applicant has invented a new structure of a capacitive rotating coupling device which when it includes several coupling components for several magnetic heads is less voluminous than the coupling devices of the prior art as the one described in the document EP 0,332,520 in which the armatures of the various coupling components are cylindrical and stacked one above another.

However, when the capacitive rotating coupling device according to the invention includes only one coupling component, the latter may have a different function from the transmission of electrical signals representing information recorded on and/or read from magnetic tape.

For example, such a coupling device may serve to perform the switching of the magnetic heads when the magnetic tape winds around the drum on an angular portion less than 180 degrees seen in transverse section relative to the axis of the drum.

The present invention also has as its object a magnetic tape recorder—reader including several magnetic heads given a rotating movement at the periphery of an equatorial slot of a cylindrical drum on the surface of which runs a tape wound helicoidally and a capacitive coupling device, said device being designed to transmit electrical signals between a part rotating around an axis connected to the heads and forming a rotor and a fixed part forming a stator, said device including at least one coupling component including a mobile part and a fixed part connected respectively to the rotor and to the stator, characterized in that the mobile and fixed parts of the coupling component are made in the form of rings and/or segments of rings, called coupling rings, respectively arranged in two mutually parallel planes and perpendicular to said axis of rotation of the rotor, the mobile and fixed parts of the coupling component being arranged facing each other.

According to one mode of implementation of the invention the coupling device transmits electrical signals representing information recorded and/or read on the tape.

According to one characteristic of the invention, at least one coupling component is formed of rings.

One coupling component may be associated with a single magnetic head or even more than two magnetic heads.

So that each coupling component may retain the same capacitance, the radial dimension of the coupling rings is reduced when the distance of the latter relative to the axis of rotation is increased.

In order to reduce the transmission perturbations due to parasitic transmissions between two consecutive coupling rings on the one hand and between the coupling rings and the ground on the other hand, a ring called a shielding ring is arranged between said rings in the same plane as the latter.

The radial dimensions of the shielding rings is reduced when the distance of the latter relative to the axis of rotation is increased.

According to one characteristic of the invention, the coupling rings connected to the rotor and to the stator are respectively arranged on two sides facing two different substrates.

The side of each substrate which is opposed to that bearing the coupling rings carries electronic circuits; thus the wire connections are reduced relative to those existing in the coupling device described in Document EP 0,332,520 since the electrical connections between the circuits and the rings have just the dimensions of the thickness of the substrate. This permits reducing the parasitic current effects and thus increasing the pass band of the coupling device.

According to other characteristics:

The electronic circuits include receiver circuits for electrical signals transmitted by the capacitive rotating coupling device as well as emitting circuits for electrical signals to be transmitted by said device.

The circuits for receiving electrical signals transmitted by the capacitive rotating coupling device are impedance matching circuits.

One of the coupling rings or segments of rings of each coupling component is connected to a receiver circuit including a high input impedance element.

For example, the high input impedance element is a double gate field effect transistor.

In order for the cutoff frequency of the high impedance circuit associated with the capacitive coupling component to be as low as possible (so as not to affect the lower limit of the frequency range) the receiver circuit includes moreover a high value impedance. The equivalent input capacitance of the double gate field effect transistor being especially low, the transfer loss is minimized.

For example, the substrate is of the multilayer type.

Advantageously, for each coupling ring or ring segment connected to a receiver circuit including a high input impedance element a ring called a guard ring is formed in the corresponding substrate and is connected to the output of said high input impedance element.

According to one characteristic, the guard ring is arranged facing the coupling ring or ring segment to form a shield relative to parasitic signals coming from the side of the substrate which carries the electronic circuits and to reduce the parasitic capacitance.

According to an additional characteristic, two supplementary shielding rings arranged on the multilayer substrate surround the guard ring in a plane perpendicular to the rotor axis.

Advantageously a supplementary coupling component is provided to measure a noise corresponding to a potential called common mode which appears at the terminals of coupling components intended to transmit electric signals representing information recorded on the tape (or read), and the signals coming from these coupling components and the supplementary coupling component are then subtracted so that the common mode potential is cancelled out.

According to another mode of implementation of the invention, the coupling device has a function of switching magnetic heads according to their position relative to the tape.

According to one characteristic, at least one coupling component is formed from ring segments.

According to yet another mode of implementation of the invention, the coupling device serves to transmit electrical signals representing information recorded, on and/or read from tape and to switch the magnetic heads according to their position relative to the tape.

In this configuration, the coupling device includes several coupling components, at least one of which is formed of ring segments, the other coupling components being formed of rings.

BRIEF DESCRIPTION OF THE DRAWINGS

FIG. 1 is a perspective diagram of a recorder—reader of the type to which the invention applies.

FIG. 2 is a view from above of the device of FIG. 1.

FIG. 4 is a diagram showing from the side in a highly schematic way the rotor-stator connections and the platter in perspective.

FIG. 5 is a schematic perspective view of two coupling components for recording and reading respectively.

DETAILED DESCRIPTION OF THE INVENTION

Figure 3:
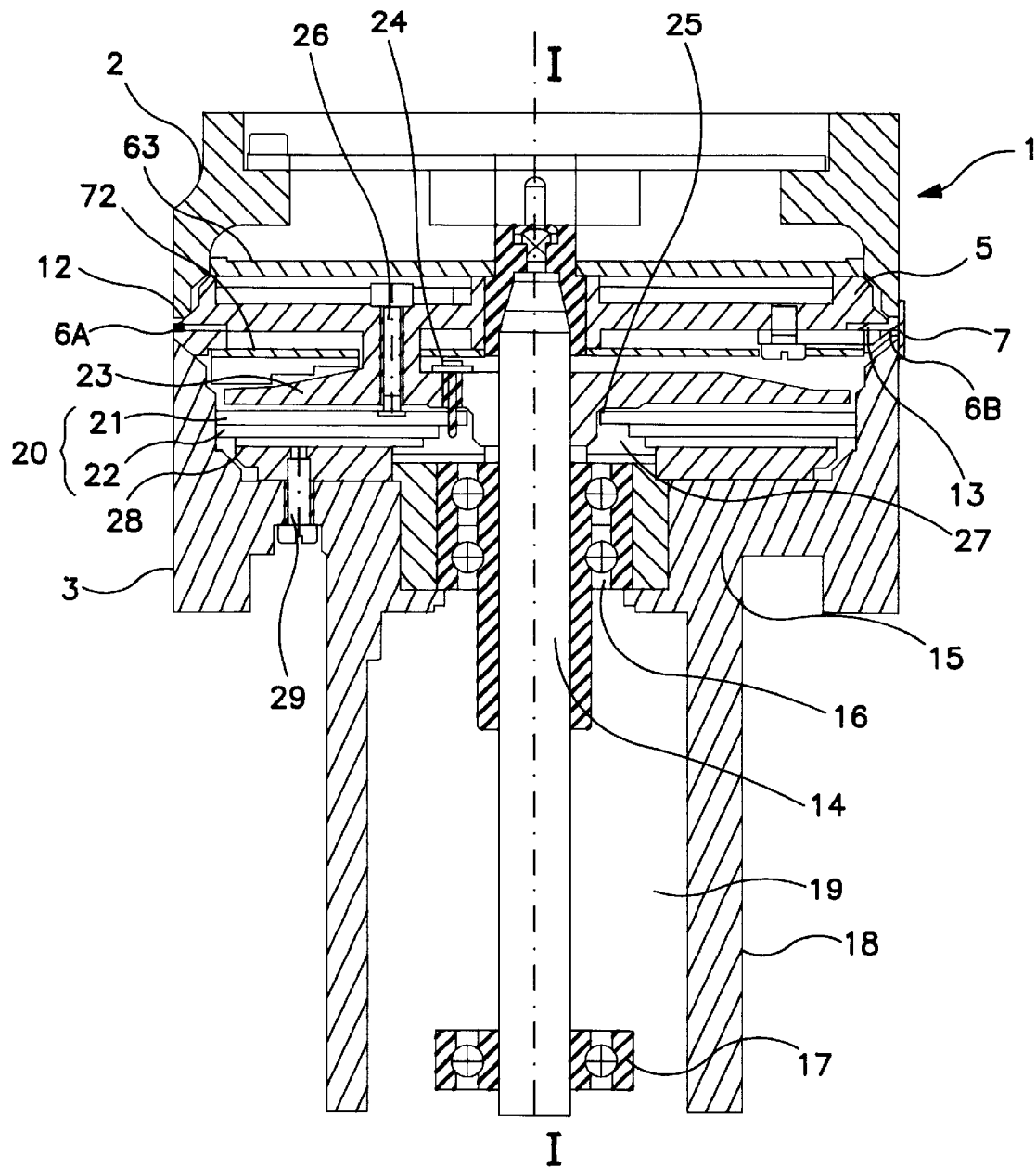
FIG. 3 is a partial cutaway view of the drum and its associated mechanical and electronic components.

The device of the present invention is described below in relation to an example of application to the field of turning magnetic head read/write apparatus of the type known in and of itself and as represented schematically in FIGS. 1 and 2.

The recorder/reader comprises a cylindrical drum 1 which is broken down into an upper drum 2 and a lower drum 3 separated by a slot 4 arranged in an equatorial plane perpendicular to the axis I—I of the drum and essentially at half the height of the latter.

In this slot there is provided an element of a general form essentially circular called a platter 5 which can be driven in a rotary movement around the axis H of the drum. The platter is the carrier of one, and generally of several, magnetic heads 6 arranged regularly on its periphery and projecting very slightly relative to the surface defining the wall of the drum.

A magnetic tape 7 is capable of being wound helicoidally around the drum 1 to form, when viewed from above as shown in FIG. 2, an omega shape. A set of rollers 8 through 11 guide the tape 7 and keep it according to this configuration during its run, from a feeder reel to a receiver reel (not represented and known in and of themselves). The information is recorded or read on the tape according to the parallel and oblique track segments relative to the axis of the tape.

It is understood that the invention applies equally to recorders/readers of the type in which the heads are fixed on the periphery of the base of an upper turning drum coaxial to a fixed lower drum, the tape running before the slot defined between the two drums.

In FIG. 3 are represented in a cutaway view the drum and the mechanical components associated therewith of a turning head recorder, in which the elements similar to those of FIGS. 1 and 2 bear the same references in each figure.

The platter 5 includes on its periphery radial tabs 12, 13 at the end of each of which is mounted a magnetic head 6A, 6B. The platter is a solid unit with a hub 14 coaxial with the axis I—I of the drum 1 and mounted in rotation on the stator 15; said hub 14 (forming a rotor) is connected to the drum by means of upper 16 and lower 17 ball bearing rollers (known in and of themselves) respectively.

Inside the lower drum 3 there is provided a cylindrical jacket 18 coaxial to the hub 14 and arranged between the rollers 16 and 17.

This jacket, of a diameter greater than that of the hub, defines a cylindrical chamber 19 in which is housed the motor, for example a Hall effect type, designed to ensure the rotation of the hub 14 of the platter 5 and magnetic heads and the turning power designed to power the platter.

A rotating capacitive coupling device 20 is housed in the upper part of the lower drum 3 (FIG. 3).

This device 20 is designed to ensure the connection between the magnetic heads connected to the rotor and the electronic means (not represented in FIGS. 1 and 2) emitting and receiving information respectively, and connected to the rotor and to the stator.

By way of illustration, the magnetic recorder—reader may be mounted on board an aircraft and receive information coming from sensors and/or command and/or control components of said aircraft. This information is therefore stored on magnetic tape to be generally read and used subsequently.

During recording the transmitting means transmit information to be recorded on tape toward the heads via the coupling device (described below); during reading, the information is routed in the other direction, from the heads to the electronic means able to store said information and/or route it to processing media.

As represented in FIG. 3, the coupling device 20 is comprised of two disks 21, 22 of the same outside diameter and arranged facing each other around the hub 14. The disk 21 forming a solid unit with the motor is mounted on a part 23 by a means of attachment 24 forming a support, of an essentially circular shape, and of which a central part which surrounds the hub 14 is elongated downwardly and penetrates into a central opening 25 of said disk 21.

This part 23 is made to be a solid unit with the platter 5 by a means of attachment 26. The disk 22 likewise has on its center part an opening 27 of dimensions greater than those of the opening 25 and into which penetrates the center part of the part 23.

The disk 22 which is a solid unit with the stator is mounted on a part 28 forming a support which is connected to the lower drum 3 by means of an attachment device 29.

In FIG. 4 is represented schematically the routing path of the information to the heart of a magnetic recorder—reader to which the invention applies. On the periphery of a rotating platter 5 are arranged sixteen magnetic heads 30 through 45 spaced regularly.

According to the example described and represented, the recorder—reader includes sixteen heads, eight of which (30, 32, 34, 36, 38, 40, 42, 44) are intended for recording and eight others (31, 33, 35, 37, 39, 41, 43, 45) are intended for reading. The number of heads may vary from four to thirty-two.

In effect, it is known that the reliability of such apparatus is an important element; it is thus necessary to be sure that the information was recorded correctly so as to be able to use it subsequently. For this purpose there is performed right after the recording a reading of the track which was just recorded. Thus, a recording head is followed (in terms of angular position on the disk) by a reading head.

Information transmitting means 46 (known in and of themselves), connected to sources of information to be recorded, have their output connected to turning electrical coupling components comprising the coupling device 20 (equal in number to the number of recording heads) bearing the respective reference numbers 47, 48, 49, 50, 51, 52, 53, and 54, and ensuring the electrical coupling between the fixed parts (stator) and the turning parts (rotor); only the axis of the motor is represented in FIG. 4. The turning part of each turning electrical coupling component 47–54 is connected to the recording heads 30, 32, 34, 36, 38, 40, 42, and 44 especially via an electronic amplifying circuit 55, 56, 57, 58, 59, 60, 61, and 62 respectively mounted on a support 63 positioned above the platter 5.

In the same way each reading head 31, 33, 35, 37, 39, 41, 43, and 45 is connected by means of amplification circuits 64, 65, 66, 67, 68, 69, 70, and 71 respectively mounted on a support 72 arranged between the part 23 and the platter 5, to the turning part of electrical coupling components 73, 74, 75, 76, 77, 78, 79, and 80 respectively; the fixed part of the latter is connected to the input of receiving means 81 of information read which are then routed to means of storing or processing (not represented). The respective means of receiving and of storage are known in and of themselves.

Thus in the example considered, there corresponds to each magnetic head a capacitive coupling component.

The coupling components are coaxial and arranged in proximity to each other, perpendicular to the axis of the rotor.

According to the example described, there are provided sixteen coupling components, namely eight for recording and eight for reading.

There are likewise provided means (known in and of themselves) of electrical power supply 82 including an power source 83 and turning components 84 (known in and of themselves) intended to ensure the transmission of energy between the stator and the rotor as well as a ground.

The capacitive coupling components according to the invention are described in greater detail below in relation to FIGS. 5 and 6.

FIG. 5 shows in perspective a recording coupling component 47 and a reading coupling component 73. Each coupling component 47, 73 comprises a turning condenser formed of two parts, one mobile 47a, 73a connected to the rotor and the other fixed 47b, 73b connected to the stator.

Each of the parts comprises one of the armatures of the condenser. These armatures have the form of circular rings of conducting material such as for example copper.

The two armatures of a given coupling component, for example 47, are of the same dimensions and are arranged at equal distance from the axis of the rotor.

The two armatures of the other coupling component 73 are likewise of the same dimensions between them and are arranged at equal distances from the axis of the rotor.

As shown in FIG. 5 the armatures 47a, 73a (or 47b, 73b respectively) of the coupling components which are connected to the rotor (or to the stator respectively) are concentric and are arranged in the same plane P1 (or P2 respectively) perpendicular to the axis of the rotor.

FIG. 4 shows the arrangement (seen in a cutaway view) of the mobile and fixed armatures of the sixteen coupling components respectively in the two planes P1 and P2. The distance between the two armatures of a given coupling component in a direction parallel to the axis of the rotor, likewise called the height, is for example on the order of 35 to 60 microns for a radial dimension or armature width on the order of 0.5 to 1.5 mm. The transfer capacitance is on the order of several pF to a few dozen pF, typically from 10 to 30 pF. The dielectric material between armatures of a given condenser is the surrounding air.

Each coupling condenser includes a transmitting armature and a receiving armature. For a recording condenser the transmitting armature is the fixed armature and the receiving armature is the turning armature. The correspondence is inverse for a reading condenser.

A transmitting circuit 85a (part of the transmitting means 46) is connected by its output to the fixed armature 47b of the coupling condenser 47 for recording while the turning armature 47a is connected to the input of a receiving circuit 86a whose output is connected (via the rotor) to the magnetic head 30 by means of the corresponding amplification circuit 55 (cf. FIG. 4). There are thus represented in FIG. 4 eight receiving circuits 86a, 86b, 86c, 86d, 86e, 86f, 86g, and 86h for each of the recording condensers 47–54.

Inversely the turning armature 73a of the coupling condenser 73 for reading is connected directly to the head 31 through the amplification circuit 64 (cf. FIG. 4) while the fixed armature 73b is connected to the input of a receiving circuit 87a which is part of the receiving means (cf. FIG. 4).

Figure 6:
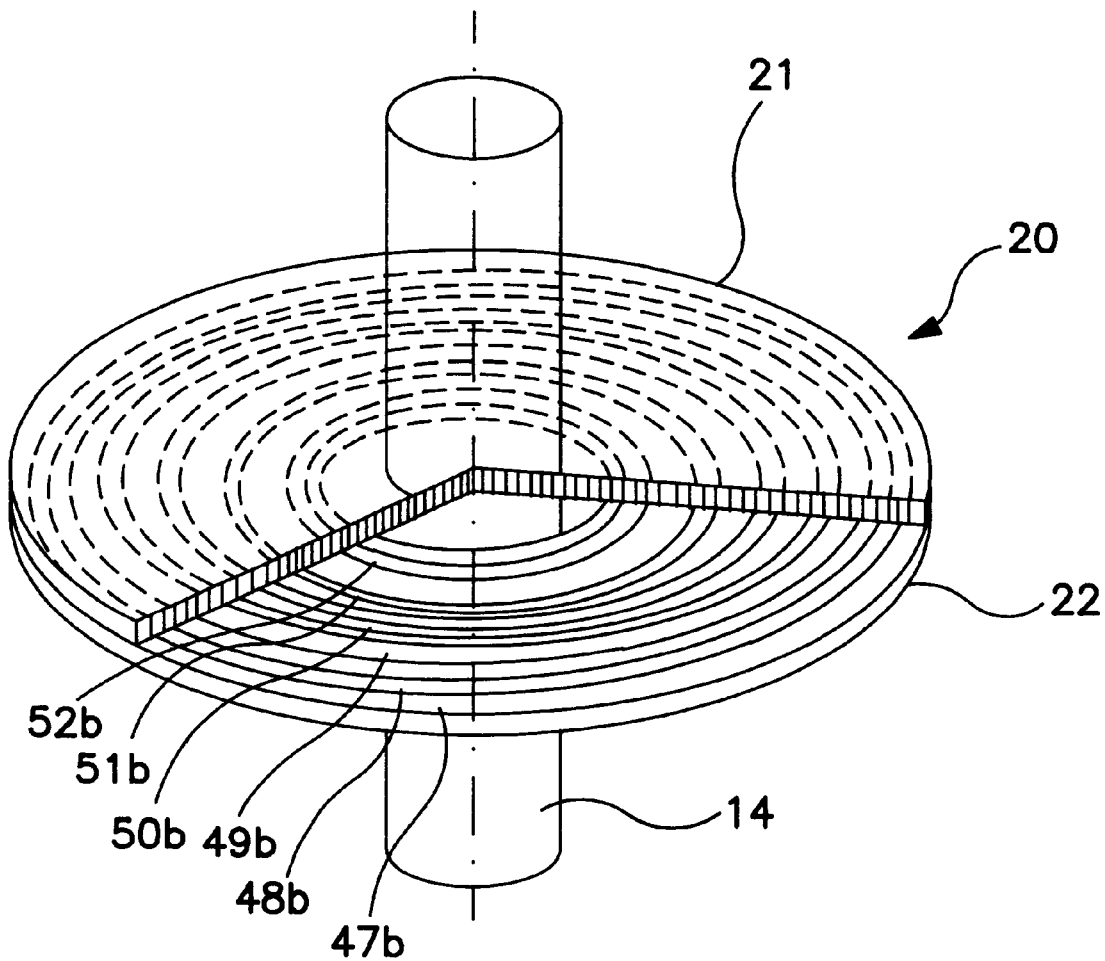
FIG. 6 is a schematic view in perspective of a coupling device according to the invention where a part of the disk connected to the rotor was partially removed.

FIG. 6 represents in a highly simplified perspective view the two disks 21 and 22 which comprise the coupling device 20 according to the invention arranged around the hub 14.

On the disk 22 connected to the stator only a few, 47b, 48b, 49b, 50b, 51b, and 52b of the concentric coupling rings (fixed armatures) of FIG. 4 are represented.

Figure 7:
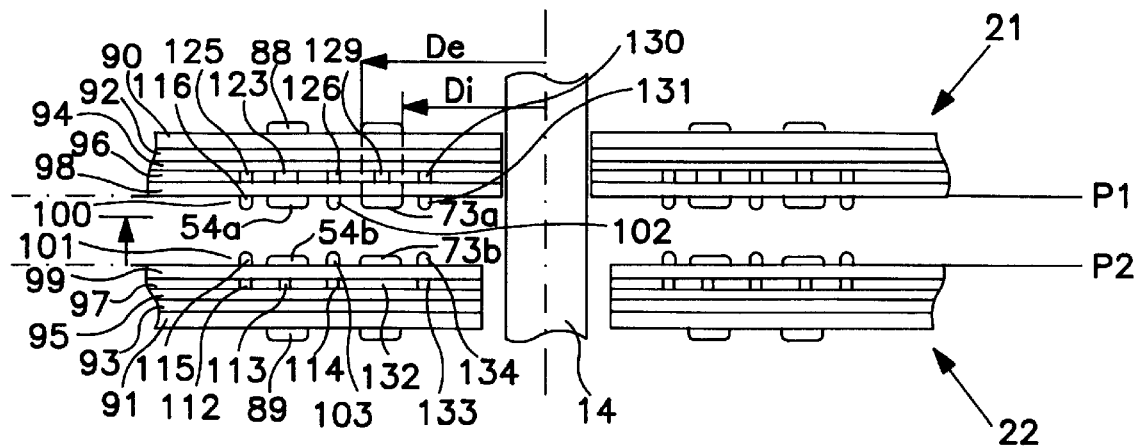
FIG. 7 is an enlarged partial schematic cutaway view in a plane containing the axis of rotation of the rotor of the coupling device according to the invention.

The disks represented in FIGS. 6 and 7 are substrates of the multilayer type comprised of an assembly of seven alternating layers of conducting material, for example copper, and insulating material, for example epoxy resin, glass, or alumina.

Thus as represented in FIG. 7 the disks 21 and 22 seen in a partial cutaway view are assembled by classical techniques of photogravure known in the field of microelectronics.

The substrate 21 (or 22 respectively) is composed of a first layer 88 (or 89 respectively) of copper, of a thickness for example ranging between 10 and 15 μm, on which are mounted electronic circuits not represented in this Figure, of a second layer 90 (or 91 respectively) comprised of epoxy resin of a third layer 92 (or 93 respectively) of copper of the same thickness as that of the first layer, of a fourth layer 94 (or 95 respectively) of epoxy glue, of a thickness for example equal to 0.2 mm, of a fifth layer 96 (or 97 respectively) of copper of the same thickness as that of the first layer, of a sixth layer 98 (or 99 respectively) comprised of epoxy resin and of a seventh layer 100 (or 101 respectively) of copper of the same thickness as that of the first layer and arranged in the plane P1 (or P2 respectively).

Each substrate has a total thickness for example equal to 1.3 mm.

From a practical point of view, such a substrate may be made by adhering to the middle of the layer 94 (or 95 respectively) two thinner substrates each comprised respectively of the stacking of layers 88, 90, 92 (or 89, 91, 93 respectively) and 96, 98, 100 (or 97, 99, 101 respectively).

These substrates are symmetric relative to the layer 94 (or 95 respectively) and for this purpose the third layer 92 (or 93 respectively) is there to ensure a balance of the masses of the two stacks.

In effect, in the absence of the third layer of copper 92 (or 93 respectively) the masses of the substrate would be ill distributed and there would be a risk of them becoming deformed during their manufacture or as a function of a temperature variation. The electrical connections between the layers 88, 96, and 100 (or 89, 97, and 101 respectively) are effected by means of metallized holes not represented which traverse the entire thickness of the substrate and have for example a thickness of around 0.6 mm. The holes which connect the layer 88 (or 89 respectively) to the layer 96 (or 97 respectively) are not metallized to the right of the layers 92 and 100 (or 93 and 101 respectively) and those connecting the layers 88 and 100 (or 89 and 101 respectively) are not metallized to the right of layers 92 and 96 (or 93 and 97 respectively).

The respective layers 100, 101 of each substrate 21, 22 include a series of concentric rings of copper comprised of coupling rings and rings called shielding so that two consecutive coupling rings, for example 54a, 73a (or 54b, 73b respectively) are separated by one shielding ring, for example 102 (or 103 respectively).

These coupling rings 54a, 54b (or 73a, 73b respectively) are used for the transmission of read signals (or of writing respectively).

In FIG. 4 the shielding rings are not represented in order to simplify the diagram but they are arranged between the coupling rings which are represented.

These shielding rings serve to reduce parasitic couplings existing between two consecutive coupling rings and which could introduce risks of diaphony during the transmission of signals.

The respective layers 100, 101 of the two substrates 21, 22 are symmetric to each other relative to a median plane passing between the substrates 21 and 22 and which is parallel to the planes P1, P2.

The width of the track of a shielding ring has been made as small as possible to reduce parasitic capacitances while minimizing diaphony. All of the coupling components must have the same coupling capacitance which is written $C=\epsilon_0 \epsilon_r S/e$, where $\epsilon_0$ and $\epsilon_r$ respectively designate the values of the dielectric constants in vacuo and in air; S is the annular area facing the rings of a given coupling component (track width) and e is the distance separating these two facing rings.

To do this, the inside and exterior diameters Di and De (FIG. 7) of the rings of a given coupling component must be adjusted so that S remains constant regardless of the position of the ring relative to the hub 14.

Thus, the width or radial dimension of the coupling rings is reduced to the extent that the distance of the latter relative to the hub 14 is increased.

It is the same for shielding rings.

The coupling and shielding rings forming the layers 100, 101 are lined for example with a deposit of gold of a thickness equal to 1 or 2 μm in order to prevent the oxidation of the conductors and to take advantage of any potential difference developed by two different materials facing each other.

Figure 8:
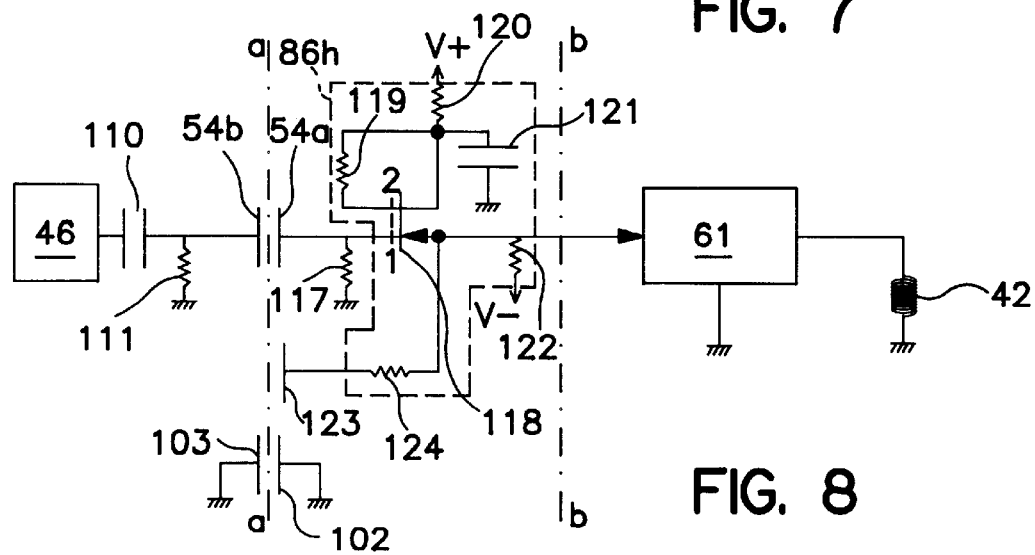
FIGS. 8 and 9 are electronic diagrams showing the circuits connecting the stator and one head of recording and reading respectively.

FIG. 8 represents a detailed view extracted from the schematic FIG. 4 of the overall electronic circuitry associated with one of the magnetic recording heads.

As represented in FIG. 8, the information transmitting means 46 is connected to one of the armatures of a condenser 110 intended to filter a direct current and capacitance for example equal to 100 nF.

The other armature is connected, on the one hand, to the ground by means of a resistor 111 and, on the other hand, to one of the armatures 54b of the coupling component 54 which is called the transmitting armature.

The condenser 110 and the resistor 111 are components mounted on the surface on the layer 89 of the fixed disk 22 (not represented in FIG. 7) and the armature 54b of the coupling component is one of the elements which comprise the layer 101 of this disk. Shielding rings 112, 113, and 114 are formed in the layer 97 in order to create a shielding effect around the armature 54b relative to parasitic capacitances.

The action of these rings is added to that of the shielding rings 103, 115 which surround the armature 54b.

The armature 54a called the receiver of the coupling component 54 is one of the elements comprising the layer 100 of the mobile disk 21, the other elements being shielding rings such as those at 102, 116 which surround the armature 54a.

Figure 9:
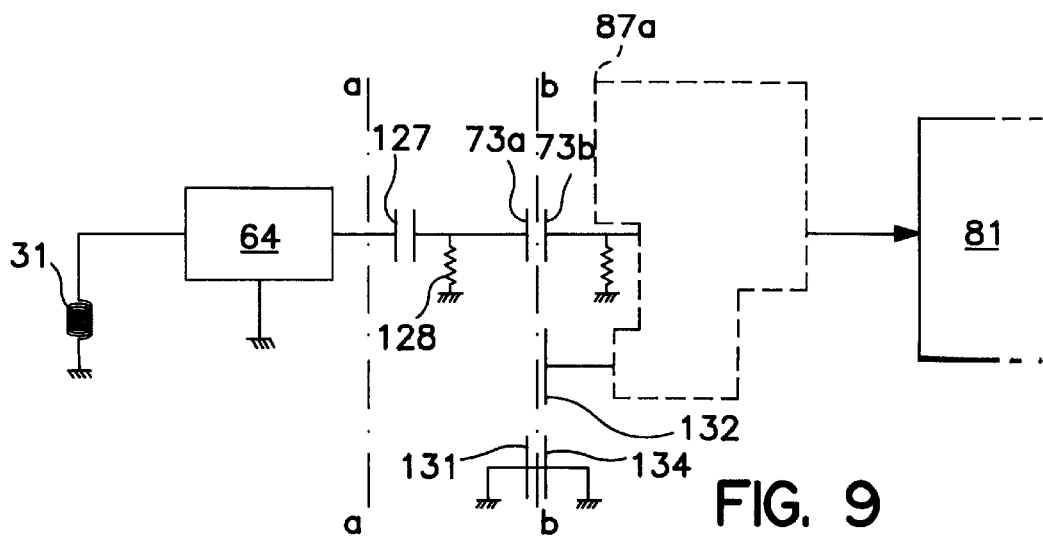

In FIGS. 8 and 9 the lines of separation with composite lines a-a and b-b respectively surround the part connected to the rotor of the coupling device according to the invention.

The armature 54a is connected to the ground by means of a resistor 117 mounted on the surface of the layer 88 of the disk 21.

The resistors 111 and 117 with respective values for example equal to 1 kΩ and 10 MΩ have the function of preventing the respective armatures 54b, 54a from charging during the rotation of the disk 21 and creating a parasitic potential difference at the terminals of the coupling component 54. The receiving armature 54a is likewise connected to a receiving circuit 86h already indicated in FIG. 4 and which is mounted on the surface on the layer 88 of the disk 21.

The receiving circuit 86h is an impedance matching circuit which includes a double gate field effect transistor (MOSFET) 118 whose grid 1 receives the signal from the armature 54a and the grid 2 is connected to a positive voltage source V+ by means of two resistors in series 119, 120. The sink of the transistor 118 is connected to the V+ source via the resistor 120 and to a capacitor 121 which is connected to the ground.

The capacitor 121 and the resistor 120 have the function of filtering the power supply. The collector of the transistor 118 is connected to a negative voltage source V− by means of a resistor 122.

Preferably the resistors 119, 120, and 122 have respective values of 100 kΩ, 100 Ω, and 2 kΩ and the capacitance 121 has a value of 100 nF.

The inclusion of this receiving circuit is advantageous for the following reason.

Taking into account the small values of the coupling condensers, namely less than 20 pF, it is appropriate to obtain a cutoff frequency as small as possible (affecting the lower limit of the pass band) to provide a high impedance R117 (several Megohms) shunted to the ground between the coupling condenser and the transistor 118.

This single impedance of 10 Mcgohms may be replaced by the equivalent insertion called in English a Boot-strap and composed of elements of lower impedance (e.g. 1 Megohm).

At the output of the receiver circuit 86h the impedance seen by the amplification circuit 61 which sends the write signals to the head 42 is for example on the order of 100 ohms.

The source of the field effect transistor 118 is likewise connected to a ring called a guard ring 123 by means of a resistor 124.

This ring is made in the form of a circular conducting track of copper mounted in the layer 96 of the disk 21 and of a lesser width than that of the coupling ring 54a (receiving armature).

The guard ring has a shielding effect relative to parasitic signals coming from the components mounted on the surface of the layer 88 and from the conducting tracts of this layer and which could reach the armature 54a.

Moreover, in picking up the signals sent out by the transistor and routing them to this guard ring 123, the potential of the receiver armature 54a is recovered on the guard ring and therefore the parasitic capacitance relative to the ground between the armature 54a and the guard ring 123 is reduced.

It should be noted that the guard ring 123 is likewise surrounded by two shielding rings 125, 126 formed in the layer 96 of the disk and which have the same function as the rings 112 and 114 of the disk 22.

FIG. 9 shows in detail the overall electronic circuitry for one of the reading heads 31.

As it happens, the read head 31 is connected to its associated amplification circuit 64, both mounted on the turning platter 5. The output of the circuit 64 (known in and of itself) is connected by the hub 14 of the rotor to the coupling component 73 and more precisely to the turning armature 73a which comprises here the receiving armature by means of a condenser 127 and a resistor 128 connected to the ground, both mounted on the surface on the layer 88 of the disk 21. Shielding rings 126, 129, and 130 are formed in the layer 96 in order to create a shielding effect around the armature 73a relative to the parasitic capacitances. The action of these rings is added to that of the shielding rings 102, 131 which surround the armature 73a. The fixed armature 73b which comprises here the transmitting armature is connected to the reading means 81 (FIG. 4).

The information, after having been picked up by the head 31, is amplified by the circuit 64, then transmitted from the rotor to the stator by the coupling component 73, then to the means 81 of reading and of processing via the receiver circuit 87a of high impedance mounted on the surface on the layer 89 of the disk 22.

The amplification circuit 64 has a low output impedance, for example 10 ohms.

The receiver circuit 87a is similar in its design and its operation to the receiver circuit 86h in FIG. 8; it is the same with the amplifier circuit 64 similar to the amplifier circuit 61 of FIG. 8.

The signals coming from the transistor (not represented) of the circuit 87a are likewise picked up and sent on a guard ring 132 mounted in the layer 97 of the disk 22. This guard ring is surrounded by two shielding rings 114, 133 mounted in the same layer. The receiver armature 73b of the coupling component is itself also surrounded by two shielding rings 103, 134 mounted in the layer 101 of the disk 22.

Thus, there is provided a set of circuits according to that of FIG. 8 for each recording head and to that of FIG. 9 for each reading head.

By virtue of the fact that the impedance between the two reference masses [grounds] respectively of the rotor and of the stator is not null, an identical voltage called common mode potential appears at the terminals of each coupling component and perturbs the transmission of the signals by these coupling components.

Figure 10A:
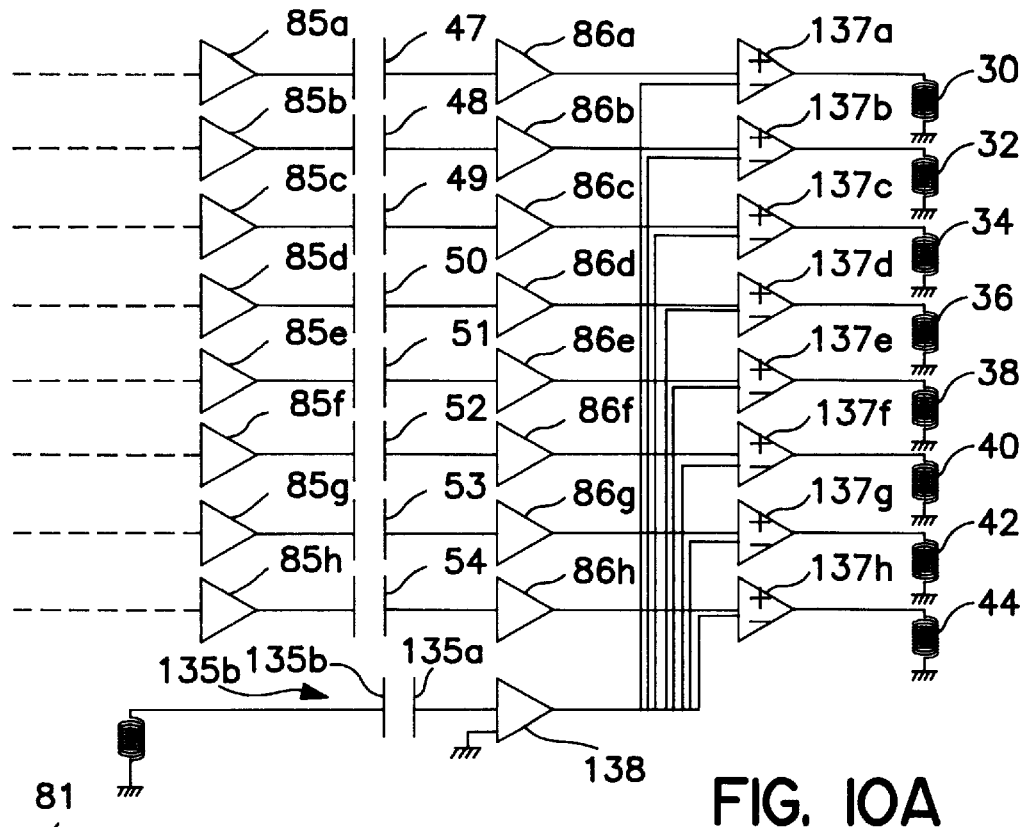
FIGS. 10A and 10B are diagrams of a form of implementation which permits suppressing the noise corresponding to the common mode potential.
Figure 10B:
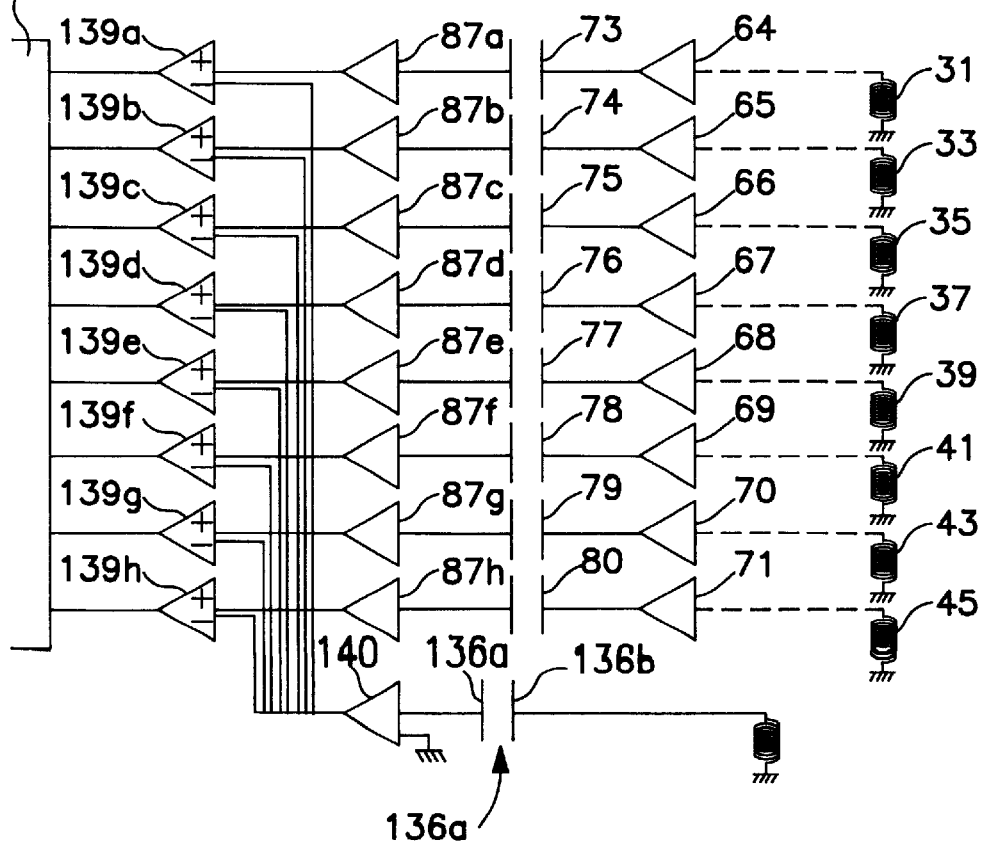

To remedy this problem a supplementary coupling ring 135 (or 136 respectively) is provided for all of the circuits intended for recording (or reading respectively) denoted by the letter A (or B respectively) at the right of FIG. 10.

These coupling rings permit measuring the common mode potential for each of the circuits of recording and of reading and which appear respectively at the terminals of the coupling components 47–54 and 73–80.

Thus, for the recording circuits (A) the information transmitting means 85a–h transmit signals to be transmitted by the coupling components 47–54 and the receiver circuits 86a–h of the signals transmitted addressing respectively these signals at the non-inverting input of the differential amplifiers 137a–h.

The coupling ring 135 has an armature 135b connected to the ground of the disk 21 while the other armature 135a is connected to one of the inputs of a differential am plifier 138 whose other input is grounded.

The output of the amplifier 138 is sent respectively to the inverter input of the amplifiers 137a–h so that the signals corresponding to the common mode potential present in the signals coming from the receivers 86a–h and from the amplifier 138 are cancelled out.

In this way the signals recorded on the magnetic heads 30, 32, 34, 36, 38, 40, 42, and 44 will no longer be affected by this parasitic noise.

Likewise for the read circuits (B) the signals coming from the read heads 31, 33, 35, 37, 39, 41, 43, 45 are respectively amplified by the circuits 64–71, transmitted by the coupling components 73–80 processed by the receiver circuits 87a–h and sent to the non-inverting input of the differential amplifiers 139a–h.

The coupling ring 136 has an armature 136b connected to the ground of the disk 22 while the other armature is connected to the input of a differential amplifier 140 whose other input is grounded.

The output of this amplifier 140 is sent respectively to the inverting input of the amplifiers 139a–h so that the signals coming from these amplifiers and sent to the receiver means 81 do not comprise any longer this common mode potential.

The pass band of the coupling device according to the invention is for example on the order of 150 MHz while that of the coupling device described in the document EP 0,332,530 is on the order of 80 MHz by virtue of the length of the wire connections.

Figure 11:
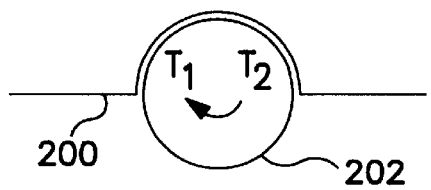
FIG. 11 is a schematic view in transverse section of a magnetic tape wound 180 degrees around a drum.

It should be noted that it could be worthwhile to use coupling components comprised of coupling ring segments when a magnetic tape 200 is wound on the outside wall of the drum 202 along a half circle (called a 180 degree winding) seen in transverse section relative to the axis of rotation of said drum (FIG. 11).

The tape may even be wound on an angular portion of the inside wall of the drum which is less than 180 degrees (e.g. 90 degrees).

Figure 12:
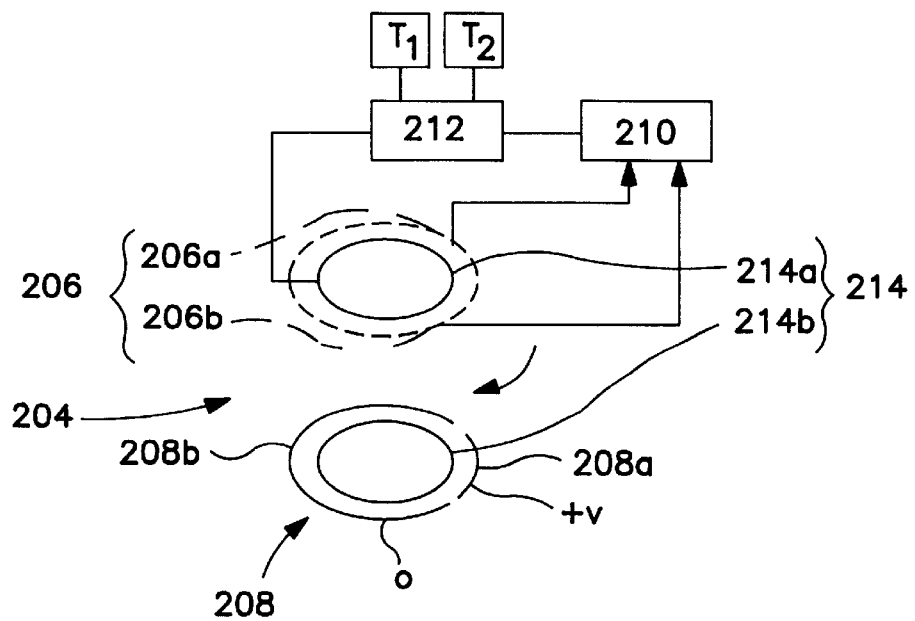
FIG. 12 is a schematic view showing a coupling device according to the invention including a switching coupling component and a coupling component designed to transmit electrical signals representing information recorded and/or read on a magnetic tape.

Thus, two magnetic heads T1, T2 diametrically opposed situated at the periphery of the drum 202 do not see the passing of the magnetic tape 200 at the same time (FIG. 12). In this figure the platter carrying the magnetic heads is not represented for the sake of clarity. According to this configuration a coupling component 204 is comprised of a mobile part 206 connected to the rotor and of a fixed part 208 connected to the stator and which are each formed for example of two ring segments.

In this mode of implementation the coupling component 204 with ring segments is used to control the selection of magnetic heads according to their position relative to the tape 200 (FIG. 11).

The two ring segments 206a, 206b of the mobile part 206 are connected on the one hand to a circuit 210 including a flip-flop (in Anglo-Saxon language) type circuit and on the other hand to a multiplexer 212 which permits selecting one of the magnetic heads T1 and T2.

For the fixed part 208 of the coupling component one of the ring segments 208a is for example powered at a voltage +V while the other segment 208b is not powered.

The position of the ring segments 206a, 206b is representative of the position of the magnetic heads T1, T2 on the drum.

The length of the segment 208a corresponds to the angular distance traveled by a magnetic head during the period of reading or of writing of said head on the tape, which corresponds to an angle on the order of 160 degrees.

Thus, the ring segments in their movement faithfully translate the displacement of the magnetic heads relative to the tape and when one magnetic head is selected the other is no longer [selected].

In the course of the rotation of the mobile part 206 and the heads T1, T2 when one of the ring segments of the mobile part of the coupling component, for example 206a, which was facing the segment 208b of the fixed part, moves in the direction of the arrow indicated in FIG. 12 and comes facing the segment 208a of the fixed part, said segment 206a sees the passage from 0 to +V and receives a positive pulse for conduction by capacitive coupling between the capacitive elements facing it. This pulse is sent on the circuit 210 whose circuitry will memorize the order of switching of the magnetic head $T_1$ and the output level of this circuitry will control the multiplexer 212 which will perform the switching on the magnetic head T1 (FIG. 12). The other ring segment 206b during its passage above the fixed ring segment 208b sees the passage from +V to 0 and receives a stop-conduction pulse which is processed by the circuits 210 and 212 which will cause stoppage of the selection of the head T2.

When the segment 206a sees then the passage from +V to 0 it receives a negative pulse for stopping the conduction and the complementary segment 206b receives a pulse for going into conduction which selects the magnetic head T2 diametrically opposed and the head T1 finds itself no longer selected.

A capacitive coupling component 214 according to those described in reference to FIG. 5 is associated with the coupling component 204 and is arranged at the center of the layer but it could very well be around the latter.

This component is comprised of a mobile part 214a connected to the circuit 212 and of a fixed part 214b and it has solely the function of transmitting between the rotor and the stator the electrical signals representing information recorded and/or read on the magnetic tape.

Thus this coupling component 214 will be alternately connected to the magnetic head $T_1$ or $T_2$.

It is likewise possible to provide two capacitive coupling components analogous to the component 214 and each connected to one of the magnetic heads $T_1$ or $T_2$, the order of writing or of reading at one magnetic head being furnished by an associated capacitive coupling component according to that described in reference to FIG. 12.

However this solution requires the use of a supplementary coupling component relative to the solution described in reference to FIG. 12 and thus takes a little more space than the latter.

It should be noted that one should have at least one coupling component for the switching of the writing heads and at least one for the switching of the reading heads.

However, with a high number of magnetic heads (eight, sixteen, thirty-two, etc.) in the recorder it is possible to have only a single read coupling component (or writing respectively) intended to ensure the switching between the capacitive coupling components ensuring the transmission of information read (or recorded respectively) on the magnetic tape and the various heads.

Figures 13, 14A, 14B:
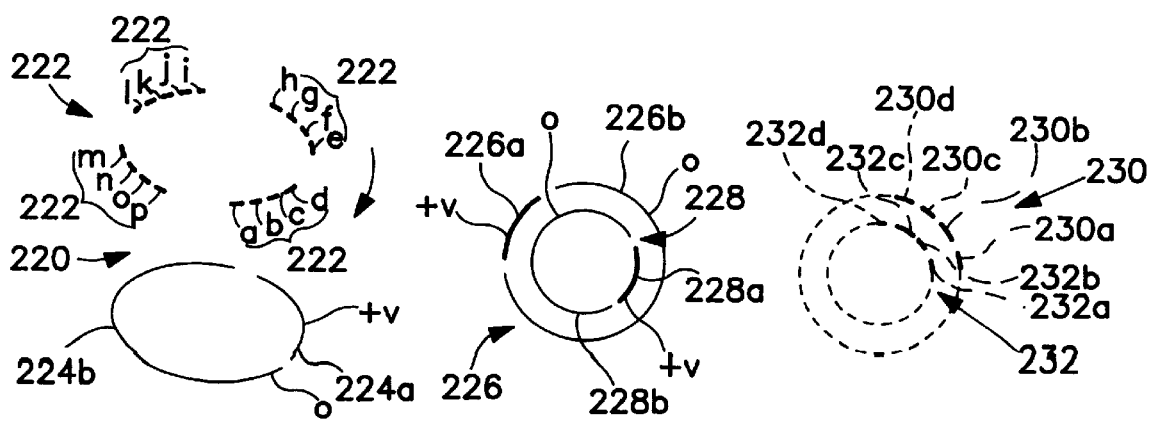
FIG. 13 represents schematically a switching coupling component according to the invention for sixteen magnetic heads.
FIGS. 14a and 14b represent schematically viewed from the top the mobile and fixed parts of two switching coupling components according to the invention.

FIG. 13 represents a coupling component 220 which can ensure the switching of sixteen read or write magnetic heads. The coupling components intended to transmit information recorded or read on the magnetic tape and to which is associated the switching coupling component 220 are not represented in this figure. There may be one of these coupling components per magnetic head or one for two or more than two magnetic heads which reduces the size of the coupling device. The switching coupling device has a mobile part 220 which is comprised of sixteen ring segments 222a–p arranged along a given circumference and positioned so as to translate the position of sixteen corresponding magnetic heads for reading or writing.

The component 220 likewise has a fixed part 224 comprised of two ring segments 224a, 224b analogous to the ring segments 208a, 208b of FIG. 12 and respectively subjected to a voltage +V and 0V.

In a way analogous to what was described in relation with FIG. 12 the selection of each of the sixteen magnetic heads (in writing or in reading) will be effected by means of circuits of the type of those at 210, 212 represented in FIG. 12 when in the course of the rotational movement of the head carrying platter, the corresponding ring segment 222a or *b* down to *p* which was facing the fixed ring segment 224b is then facing the fixed ring segment 224a and thus sees by capacitive coupling a transition from 0 to +V.

Likewise, a head will be no longer selected when the corresponding mobile ring segment sees by capacitive coupling a transition from +V to 0.

By way of variant, to ensure the switching of eight magnetic heads with a better resolution, it is possible to use two concentric capacitive coupling components as represented in FIGS. 14a and *b*.

FIG. 14a (or 14b respectively) represents in a view from above the fixed part (or mobile respectively) of the two coupling components. The fixed part 226 (or 228 respectively) of the outside coupling component (or inside respectively) is comprised of two ring segments 226a, b (or 228a, b respectively), one of which 226a (or 228a respectively) has a length corresponding to a writing period or a reading period of a magnetic head on the band and is subjected to a voltage +V while the other segment 226b (or 228b respectively) is not subjected to a voltage.

The mobile part 230 (or 232 respectively) of the outside coupling component (or inside respectively) is comprised of four ring segments 230a–d (or 232a–d respectively) which are respectively representative of the position of the eight magnetic heads.

The operation during the rotational movement of the mobile part (FIG. 14b) is analogous to that which was already described previously in relation with FIGS. 11 through 13.

It should be noted that the use of a ring segment coupling component as described in reference to FIGS. 11 through 13 may likewise replace a classical switching system used in magnetic recorders of the prior art where the coupling device for the transmission of electrical signals representative of information recorded and/or read on the tape is likewise known, such as for example the one described in European patent number 0,332,520.

The ring segment coupling component according to the invention may even replace a switching system used in a magnetic recorder of the prior art where the coupling device is implemented by transformers.

The ring segment coupling component used for the switching of magnetic heads is advantageous relative to the classical switching systems since it is part of the capacitive coupling device and is thus directly connected to the displacement of the magnetic heads. This permits avoiding errors of accuracy while a classical switching system of heads as mentioned must be aligned with the axis of the rotor and must be synchronized with the displacement of the heads.

Moreover, such a coupling component simplifies the design of the recorder, given that the capacitive coupling components transmitting information and those intended for switching are included in the same coupling device and have come from the same technology. They are thus designed in the same stages of manufacture. Moreover, the electronic part of the recorder is simplified relative to those of the recorders of the prior art which use other switching systems.

What is claimed is:

1. A magnetic tape recorder/player including several magnetic heads (30–45; $T_1$, $T_2$) driven in a rotational movement at the periphery of an equatorial slot (4) of a cylindrical head (1) on the surface of which runs a tape (7) wound helicoidally and a capacitive coupling device (20), said device transmits electrical signals between a part rotating around an axis connected to the heads and forming a rotor and a fixed part forming a stator, said device (20) including at least one coupling component (47–54, 73–80; 204; 220) including a mobile element (47a–54a, 73a–80a; 206; 222; 230; 232) and a fixed element (47b–54b, 73b–80b) connected respectively to the rotor and to the stator, characterized in that the mobile and fixed elements of the coupling are made in the form of rings and/or segments of rings called coupling, respectively arranged in two mutually parallel planes ($P_1$, $P_2$) and perpendicular to said axis of rotation of the rotor, the mobile and fixed elements of each coupling component being arranged facing each other.

2. A recorder/reader according to claim 1 in which the coupling device transmits the electrical signals representing recorded on and/or read from information on the tape.

3. A recorder/reader according to claim 2, in which at least one coupling component is formed of rings.

4. A recorder/reader according to claim 3 in which a coupling component is associated with at least one magnetic head.

5. A recorder/reader according to claim 2, in which the coupling device includes several coupling components at least one of which is formed of ring segments, the other coupling components being formed of rings.

6. A recorder/reader according to claim 1, in which the radial dimension of the coupling rings (47a–54a, 47b–54b, 73a–80a, 73b–80b) is reduced when the distance of the latter relative to the axis of rotation is increased.

7. A recorder/reader according to claim 1, in which a ring called a shielding ring (102; 103) is arranged between two consecutive coupling rings (54a, 73a; 54b, 73b) in the same plane as the latter.

8. A recorder/reader according to claim 7 in which the radial dimension of the shielding rings is reduced when the distance of the latter relative to the axis of rotation is increased.

9. A recorder/reader according to claim 8, in which the substrate (21, 22) is of the multilayer type.

10. A recorder/reader according to claim 1, in which the coupling rings connected to the rotor (47a–54a, 73a–80a) and to the stator (47b–54b, 73b–80b) are respectively arranged on two sides facing two different substrates (21, 22).

11. A recorder/reader according to claim 10, in which the side of each substrate (21, 22) which is opposite to that carrying the coupling rings carries electronic circuits.

12. A recorder/reader according to claim 11, in which the electronic circuits include receiver circuits (86a–h, 87a–h), of the electrical signals transmitted by the capacitive rotating coupling device as well as the circuits for transmitting the electrical signals to be transmitted by said device.

13. A recorder/reader according to claim 12, in which the receiver circuits (86a–h, 87a–h) of the electrical signals transmitted by the capacitive rotary coupling device (20) are the impedance matching circuits.

14. A recorder/reader according to claim 13, in which one of the coupling ring segments or rings of each coupling component (47–54, 73–80) is connected to a receiving circuit (86*a–h*, 87*a–h*) including a high input impedance element.

15. A recorder/reader according to claim 14, in which the high input impedance element is a double gate field effect transistor.

16. A recorder/reader according to claim 15, in which the receiver circuit (86*a–h*, 87*a–h*) includes moreover a high impedance value compared to the equivalent input capacitance of the double gate field effect transistor.

17. A recorder/reader according to claim 1, in which for each coupling ring segment or ring connected to a receiver circuit (86*h*, 87*a*) including a high input impedance element a ring called a guard ring (123, 132) is formed in the corresponding substrate and is connected to the output of said high input impedance element.

18. A recorder/reader according to claim 17, in which the guard ring is arranged facing the coupling ring or ring segment to form a shield relative to parasitic signals coming from the side of the substrate which carries the electronic circuits.

19. A recorder/reader according to claim 17 or 18 in which two supplementary shielding rings (125, 126, 114, 133) arranged on the multilayer substrate surround the guard ring (123, 132) in a plane perpendicular to the axis of the rotor.

20. A recorder/reader according to claim 1, in which a supplementary coupling component (135, 136) is provided to measure a noise corresponding to a potential called the common mode potential which appears at the terminals of the coupling components (47–54, 73–80) intended to transmit electrical signals representing information recorded on the tape (or read respectively) and the signals coming from these coupling components and the supplementary coupling component are then subtracted so that the common mode potential is cancelled out.

21. A recorder/reader according to claim 1, in which the coupling device (204, 220) has a function of switching the magnetic heads ($T_1$, $T_2$) according to their position relative to the tape.

22. A recorder/reader according to claim 21, in which at least one coupling component is formed of ring segments.

* * * * *